June 1, 1926.

J. L. PRICE 1,586,699

BRAKE OPERATING CONNECTION

Filed May 23, 1925

INVENTOR
JACOB L. PRICE
BY
ATTORNEY

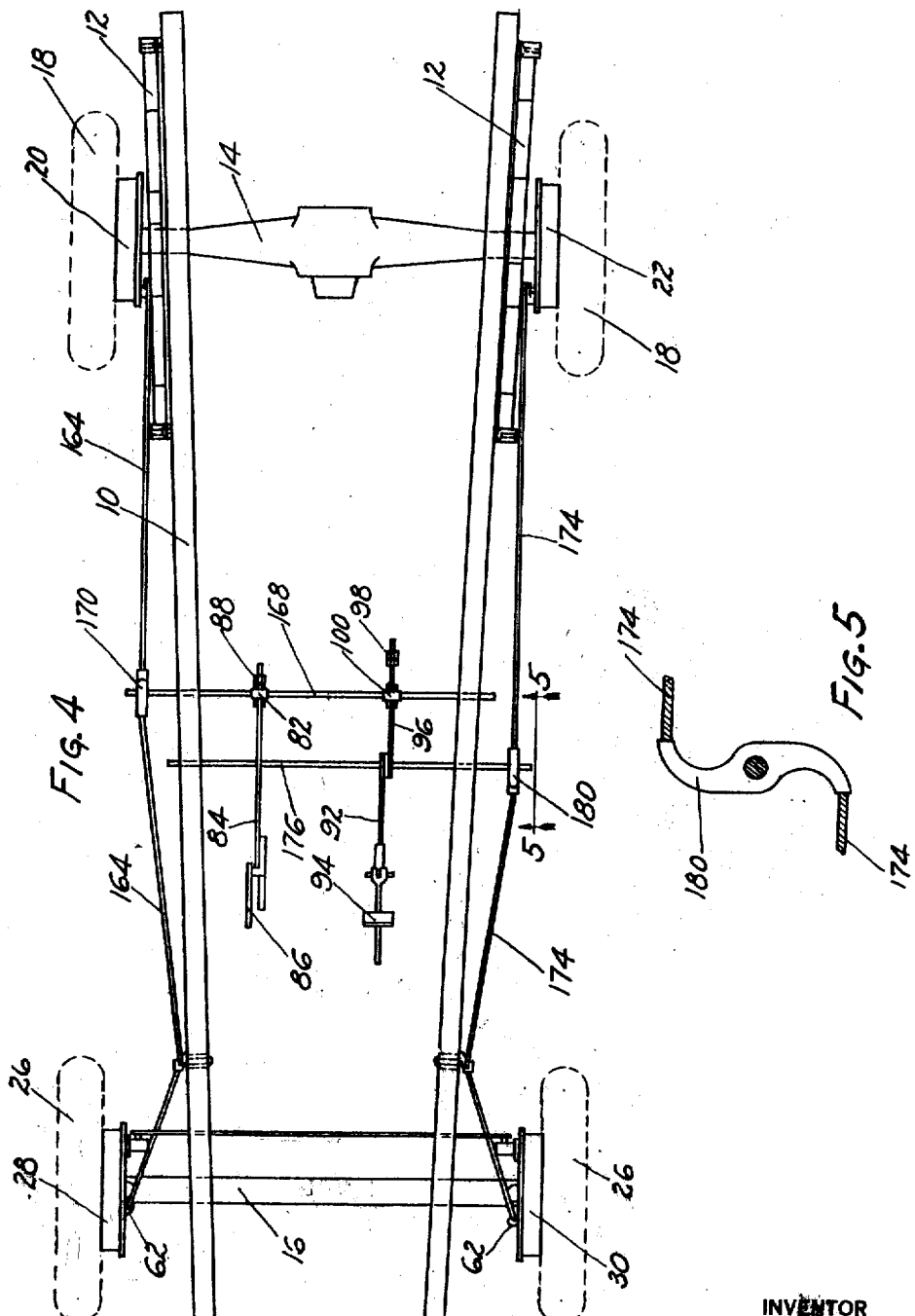

Patented June 1, 1926.

1,586,699

UNITED STATES PATENT OFFICE.

JACOB L. PRICE, OF CHICAGO, ILLINOIS, ASSIGNOR TO BENDIX BRAKE COMPANY, OF CHICAGO, ILLINOIS, A CORPORATION OF ILLINOIS.

BRAKE-OPERATING CONNECTION.

Application filed May 23, 1925. Serial No. 32,235.

This invention relates to operating connections for vehicle brakes, and is illustrated as embodied in an automobile chassis. An object of the invention is to secure an inexpensive but safe set of connections, suitable for use on the cheaper cars, and which will meet the requirements of all the various State laws, some of which require two independently operable sets of brakes.

Having this object in mind, the invention contemplates operation by the brake pedal or other service member of a brake acting on one of the front wheels and a brake acting on one of the rear wheels, preferably one on the opposite side of the vehicle, while the emergency lever or its equivalent operates the other brakes. In one desirable arrangement, there is a connection between the two braking systems, so that the service member applies all the brakes, whereas the emergency member applies only its own system.

The particular connection shown is arranged to be readily rendered inoperative, for driving in States requiring two entirely independent sets of brakes by simultaneously operating the service and emergency members.

Thus, according to my invention, any application of the brakes acts on at least one front wheel and at least one rear wheel. As is well known, this is much less likely to cause skidding than the usual action on the two rear wheels alone.

The above and other objects and features of my invention, including various novel combinations of parts and desirable particular constructions, will be apparent from the following description of one illustrative embodiment shown in the accompanying drawings, in which:

Figure 4 is a top plan view corresponding to Figure 1, but showing each front brake connected to the rear brake on the same side of the vehicle;

Figure 5 is a side elevation looking in the direction of the arrows 5—5 in Figure 4, showing one of the cable equalizers.

Figure 1:
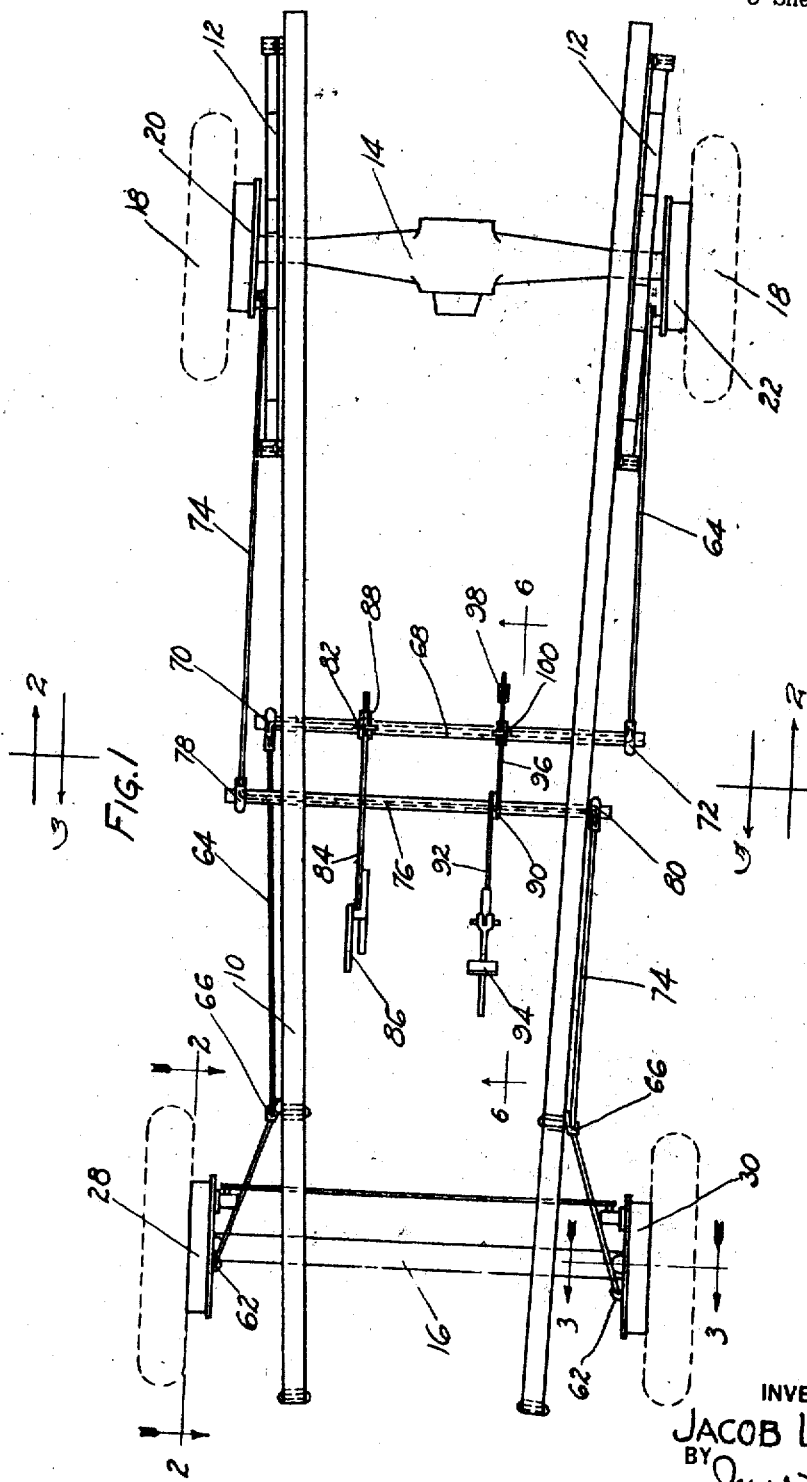
Figure 1 is a top plan view of an automobile chassis in which each of the two brake systems includes diagonally-opposite front and rear brakes.

In the arrangement of Figure 1, the vehicle comprises a chassis frame 10, supported by springs 12 on a rear axle 14 and a front axle 16. The rear axle is supported on road wheels 18 having respectively right and left brakes 20 and 22. The front axle has swivelled thereto the usual knuckles 24 (Figure 3), rotatably supporting the wheels 26 having the right and left brakes 28 and 30 (Figure 1).

Figure 2:
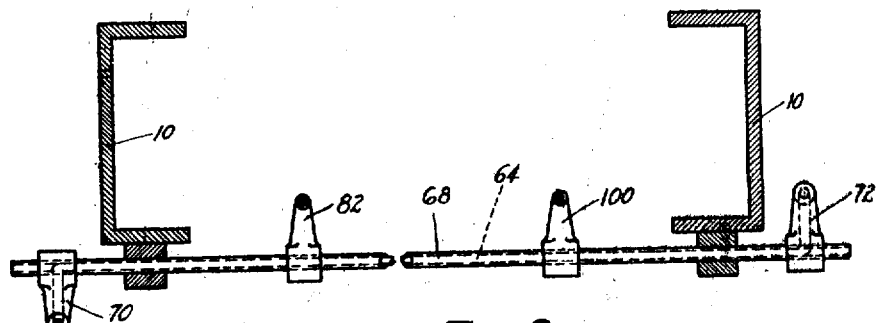
Fig. 2 is a transverse vertical section on the line 2—2 of Fig. 1, looking rearwardly of the vehicle.

In the hook-up of Figure 1, brakes 28 and 22, i. e., the right front and the left rear, are operated by equalizing connections shown as a cable 64, which may be supported by a pulley or idler arm 66 at the rear end of the front spring, and which passes through a hollow shaft 68 having hollow tensioning arms 70 and 72 extending respectively downwardly from its left end and upwardly from its right end (Figure 2).

Figure 3:
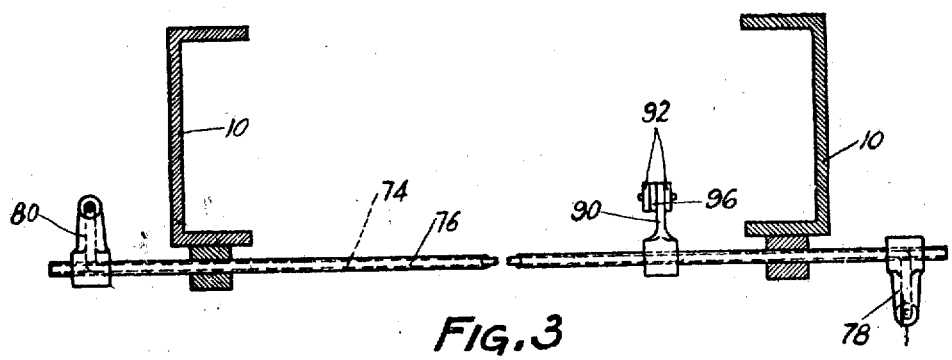
Fig. 3 is a transverse vertical section on the same line in Fig. 1, but looking forwardly of the vehicle in the direction of the arrows 3—3.
Figure 6:
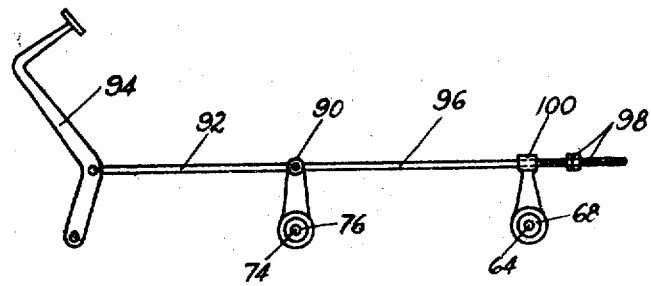
Fig. 6 is a vertical section on the line 6—6 of Fig. 1, showing the brake pedal in side elevation.

Similarly brakes 30 and 20 are operated by a cable 74 passing through a hollow shaft 76 having hollow tensioning arms 78 and 80 (Figure 3).

The hollow shaft 68 is rocked to apply its brakes by an arm 82 having an opening slidably receiving a link 84 from the emergency brake lever 86, the link being threaded to carry an adjustable stop 88 for operatively engaging arm 82. Thus link 84 and stop 88 form an over-running connection from the lever 86.

Hollow shaft 76 has an arm 90, connected by a link 92 to the service brake pedal 94, and preferably there is another link 96 having adjustable threaded stops 98 which are idle in the position shown, but which can be adjusted forwardly by threading them on the link to operate an arm 100 on shaft 68. Thus the brake lever 86 operates brakes 28 and 22, while pedal 94 operates brakes 30 and 20. At the same time the driver, when in an emergency he operates pedal 94 and lever 86 simultaneously, does not merely lock his rear wheels, as with the ordinary hook-up, but doubles the effectiveness of his brakes. Ordinarily stop 98 is adjusted so that the pedal 94 operates all four brakes.

The arrangement of Figure 4 differs from that just described in that each front brake is equalized against the rear brake on the same side of the vehicle. Thus brakes 28 and 20 are connected by a cable 164 operated by a shaft 168, corresponding to the hollow shaft 68 and operated by the emergency brake lever, but having an S-shaped equalizing double tension lever 170 at its end for the cable 164.

Similarly brakes 22 and 30 are operated by a cable 174 tensioned by rocking, by means of the service pedal, a shaft 176 having a double cable-tensioning lever 180. Lever 180 is shown in side elevation in Figure 5, and has opposite arms circular or channel-shaped in cross-section, to tension the cable while permitting it to slide to equalize the brakes.

While two illustrative embodiments of the invention have been described in detail, it is not my intention to limit its scope to those particular embodiments, or otherwise than by the terms of the appended claims.

I claim:

1. A vehicle having, in combination, two rear brakes, two front brakes, a service member and connections arranged to operate one front brake and one rear brake, and an emergency brake member and connections arranged to operate the other front brake and the other rear brake.

2. A vehicle having, in combination, two rear brakes, two front brakes, a service member and connections arranged to operate one front brake and the rear brake on the opposite side of the vehicle, and an emergency brake member and connections arranged to operate the other front brake and the other rear brake.

3. A vehicle having, in combination, two rear brakes, two front brakes, equalizing connections between one front brake and one rear brake, different equalizing connections between the other two brakes, a service member arranged to operate the first equalizing connections, and an emergency brake member arranged to operate the second equalizing connections.

4. A vehicle having, in combination, two rear brakes, two front brakes, equalizing connections between one front brake and the opposite rear brake, different equalizing connections between the other two brakes, a service member arranged to operate the first equalizing connections, and an emergency brake member arranged to operate the second equalizing connections.

5. A vehicle having, in combination, two rear brakes, two front brakes, a cable connecting one of the front brakes and one of the rear brakes, a second cable connecting the other two brakes, a service member arranged to tension one cable to apply its brakes, and an emergency brake member connected to tension the other cable to apply its brakes.

6. A vehicle having, in combination, two rear brakes, two front brakes, a cable connecting one of the front brakes and the rear brake on the opposite side of the vehicle, a second cable connecting the other two brakes, a service member arranged to tension one cable to apply its brakes, and an emergency brake member connected to tension the other cable to apply its brakes.

7. A vehicle having, in combination, two rear brakes, two front brakes, a service member and connections therefrom for operating all four brakes, and an emergency member and connections therefrom for operating one front brake and one rear brake.

8. A vehicle having, in combination, two rear brakes, two front brakes, a service member and connections therefrom for operating all four brakes, and an emergency member and connections therefrom for operating one front brake and the rear brake on the opposite side of the vehicle.

9. A vehicle having, in combination, two rear brakes, two front brakes, equalizing connections between one front brake and one rear brake, different equalizing connections between the other two brakes, a service member arranged to operate both sets of equalizing connections, and an emergency member arranged to operate one set of equalizing connections only.

10. A vehicle having, in combination, two rear brakes, two front brakes, a cable connection between one front brake and one rear brake, different cable connection between the other two brakes, a service member arranged to operate both cable connections, and an emergency member arranged to operate one of the cable connections only.

11. A vehicle having, in combination, two braking systems, each including a brake acting on a front wheel and a brake acting on a rear wheel, a service member for operating one of the systems, and an emergency member for operating the other system.

12. A vehicle having, in combination, two braking systems, each including a brake acting on a front wheel and a brake acting on a rear wheel, a service member for operating one of the systems, and an emergency member for operating one system only.

13. A vehicle having, in combination, two braking systems, each including a brake acting on a front wheel and a brake acting on a rear wheel, a service member for operating one system, an emergency member for operating the other system, and an over-running connection from the service member for operating said other system.

14. A vehicle having, in combination, two braking systems, each including a brake acting on a front wheel and a brake acting on a rear wheel, a service member for operating one system, an emergency member for operating the other system, and a connection from the service member for operating said other system and arranged to be readily rendered inoperative to permit independent operation of the two systems.

15. A vehicle having, in combination, two braking systems, each including a brake acting on a front wheel and a brake acting on a rear wheel, a service member for operating one system, an emergency member for operating the other system, and a connection from the service member for operating said other system and arranged to be readily adjusted to an inoperative condition in which it does not operate said other system.

16. A vehicle having, in combination, two rear brakes, two front brakes, a service member and connections therefrom for operating all four brakes and two separate operating members and connections therefrom one for operating one front brake and the rear brake on the opposite side of the vehicle and the other member and connections for operating the other front brake and the rear brake on the opposite side of the vehicle.

In testimony whereof I have hereunto signed my name.

JACOB L. PRICE.

braking systems, each including a brake acting on a front wheel and a brake acting on a rear wheel, a service member for operating one system, an emergency member for operating the other system, and a connection from the service member for operating said other system and arranged to be readily rendered inoperative to permit independent operation of the two systems.

15. A vehicle having, in combination, two braking systems, each including a brake acting on a front wheel and a brake acting on a rear wheel, a service member for operating one system, an emergency member for operating the other system, and a connection from the service member for operating said other system and arranged to be readily adjusted to an inoperative condition in which it does not operate said other system.

16. A vehicle having, in combination, two rear brakes, two front brakes, a service member and connections therefrom for operating all four brakes and two separate operating members and connections therefrom one for operating one front brake and the rear brake on the opposite side of the vehicle and the other member and connections for operating the other front brake and the rear brake on the opposite side of the vehicle.

In testimony whereof I have hereunto signed my name.

JACOB L. PRICE.

Certificate of Correction.

It is hereby certified that in Letters Patent No. 1,586,699, granted June 1, 1926, upon the application of Jacob L. Price, of Chicago, Illinois, for an improvement in "Brake-Operating Connections," an error appears in the printed specification requiring correction as follows: Page 1, lines 24 and 25, strike out the words "for driving in States requiring two entirely independent sets of brakes" and insert instead *but even in this condition all four brakes may be applied when a sudden stop is necessary;* and that the said Letters Patent should be read with this correction therein that the same may conform to the record of the case in the Patent Office.

Signed and sealed this 3d day of August, A. D. 1926.

[SEAL.]

M. J. MOORE,
*Acting Commissioner of Patents.*

Certificate of Correction.

It is hereby certified that in Letters Patent No. 1,586,699, granted June 1, 1926, upon the application of Jacob L. Price, of Chicago, Illinois, for an improvement in "Brake-Operating Connections," an error appears in the printed specification requiring correction as follows: Page 1, lines 24 and 25, strike out the words " for driving in States requiring two entirely independent sets of brakes" and insert instead *but even in this condition all four brakes may be applied when a sudden stop is necessary;* and that the said Letters Patent should be read with this correction therein that the same may conform to the record of the case in the Patent Office.

Signed and sealed this 3d day of August, A. D. 1926.

[SEAL.]                                                    M. J. MOORE,
*Acting Commissioner of Patents.*